United States Patent
Arai et al.

[19]

[11] Patent Number: 5,929,906
[45] Date of Patent: Jul. 27, 1999

[54] COLOR CORRECTING METHOD AND APPARATUS

[75] Inventors: Yoshifumi Arai, Tokyo; Shiro Usui, 10-2-804, Nishitoyowa, Yayoicho, Toyohashi-shi, Aichi-ken, both of Japan

[73] Assignees: Shiro Usui, Toyohashi, Japan; Toyo Ink Manufacturing Co., Ltd., Tokyo, Japan

[21] Appl. No.: 08/736,257

[22] Filed: Oct. 24, 1996

[30] Foreign Application Priority Data

Dec. 7, 1995 [JP] Japan ................................. 7-319302

[51] Int. Cl.[6] ........................................... H04N 9/73
[52] U.S. Cl. ......................... 348/223; 348/157; 358/518; 382/156
[58] Field of Search ..................... 348/207, 222, 348/223, 225, 228, 234, 235, 236, 362, 366, 649, 650, 651, 652, 653, 654, 655; 358/518, 520; 382/156, 162, 167; 706/15, 17, 25; H04N 9/73

[56] References Cited

U.S. PATENT DOCUMENTS

| | | | |
|---|---|---|---|
| 4,500,919 | 2/1985 | Schreiber | 358/518 |
| 5,185,850 | 2/1993 | Usui et al. | 358/518 |
| 5,546,195 | 8/1996 | Arai | 358/518 |
| 5,771,311 | 6/1998 | Arai | 382/162 |

*Primary Examiner*—Tuan V. Ho
*Attorney, Agent, or Firm*—Ladas & Parry

[57] ABSTRACT

A color correcting unit receives color separation values such as CMY values from an image input unit. Under the control of a control portion, inputs to a first conversion portion constituted by a neural network which has been trained in advance on the basis of the spectral distribution of an arbitrary illuminant are corrected so that outputs from the first conversion portion satisfy the color separation values and a predetermined requirement. The input values to the first conversion portion, which satisfy the predetermined requirement, are sent to an image output unit. The image output unit outputs an image in accordance with these input values.

11 Claims, 12 Drawing Sheets

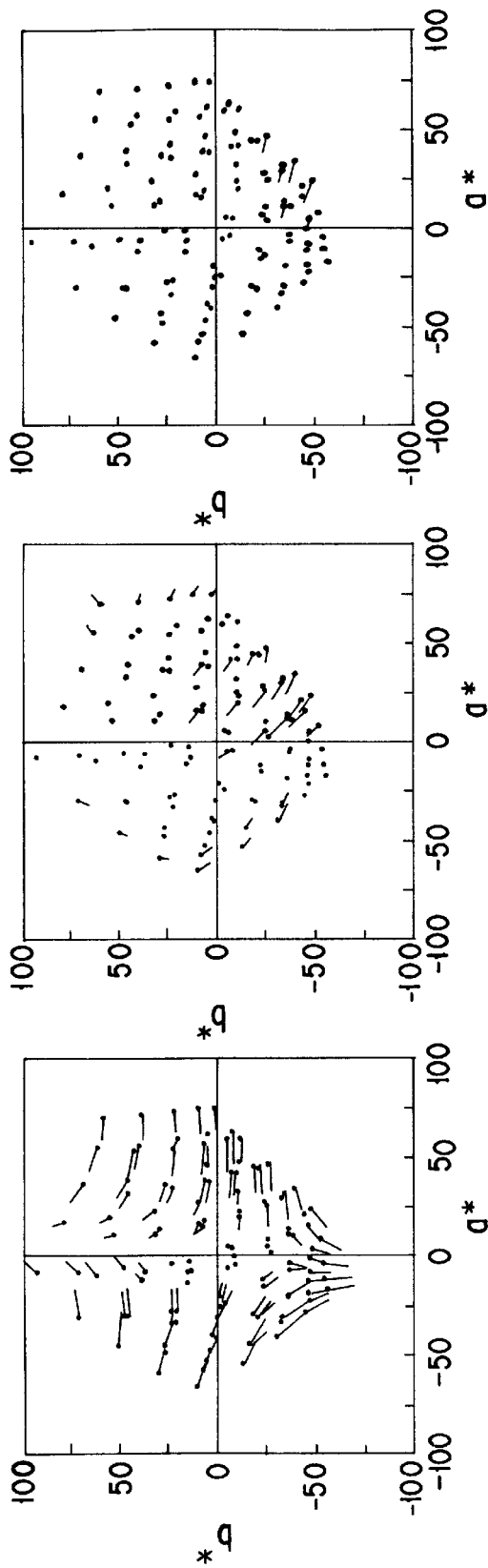
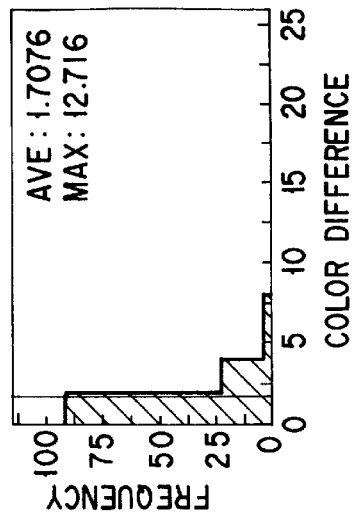
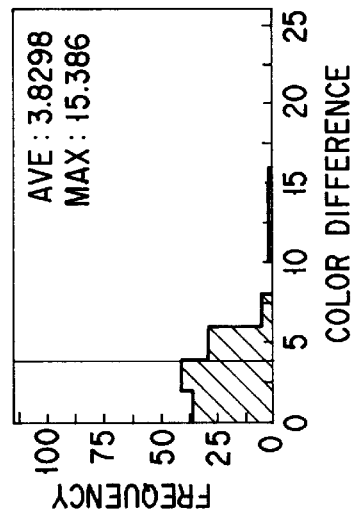
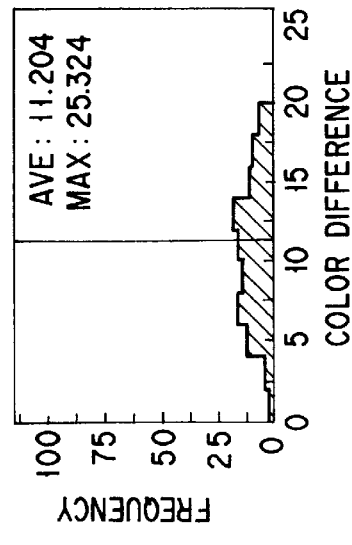
FIG. 7A  FIG. 7B  FIG. 7C
FIG. 7D  FIG. 7E  FIG. 7F

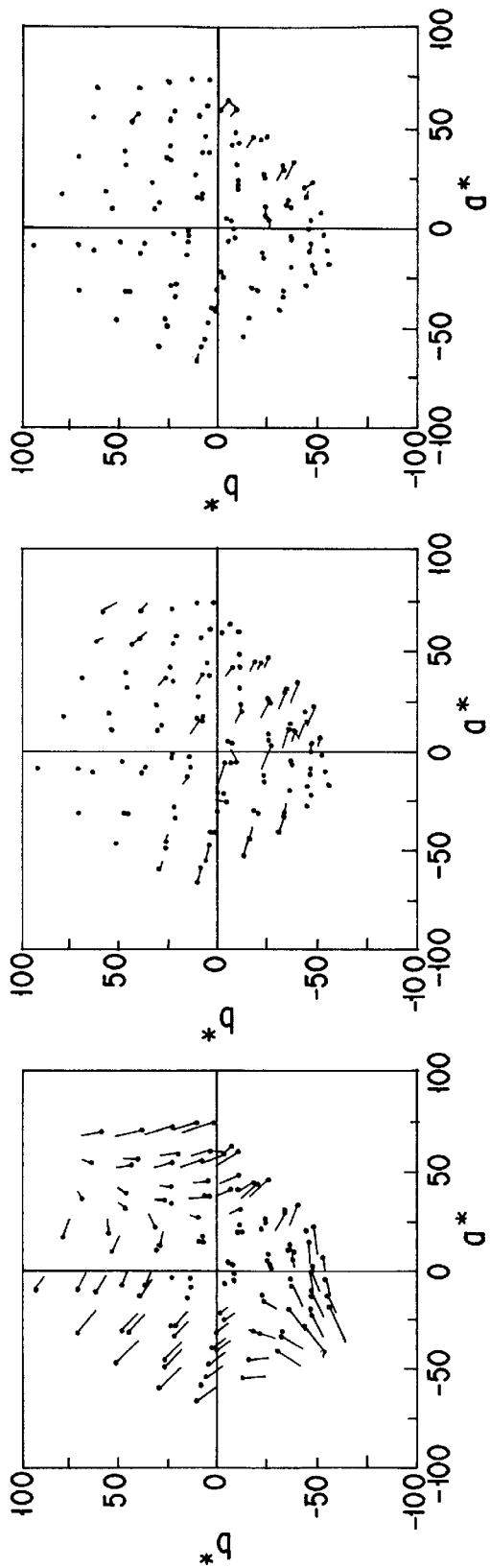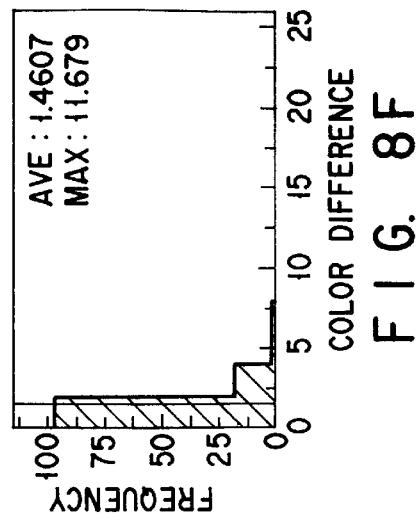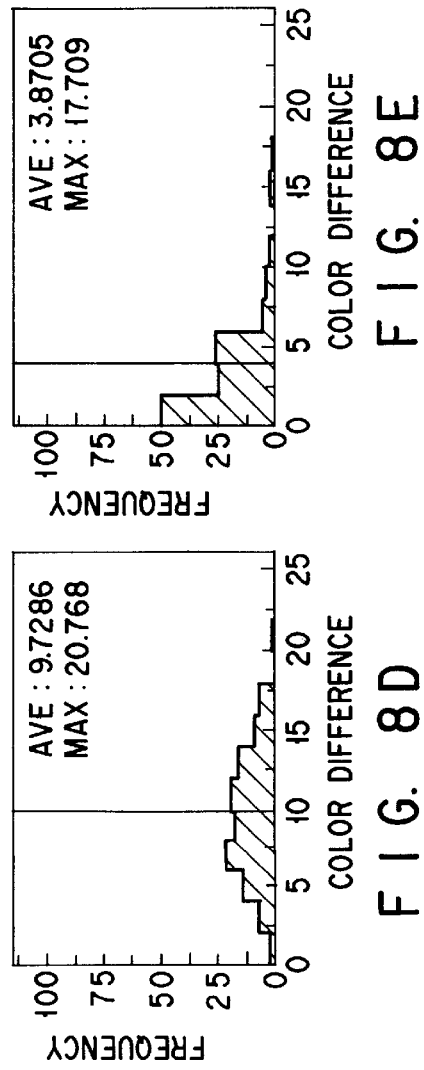
FIG. 8A  FIG. 8B  FIG. 8C
FIG. 8D  FIG. 8E  FIG. 8F

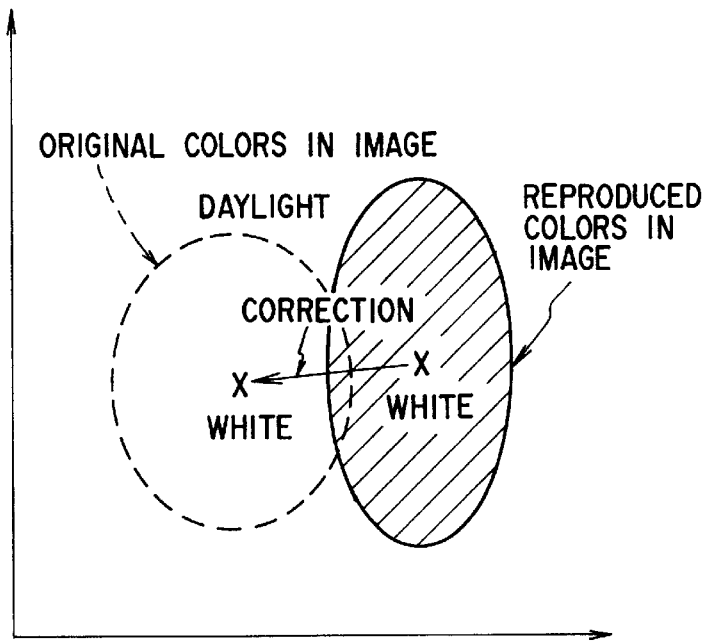
F I G. 9A
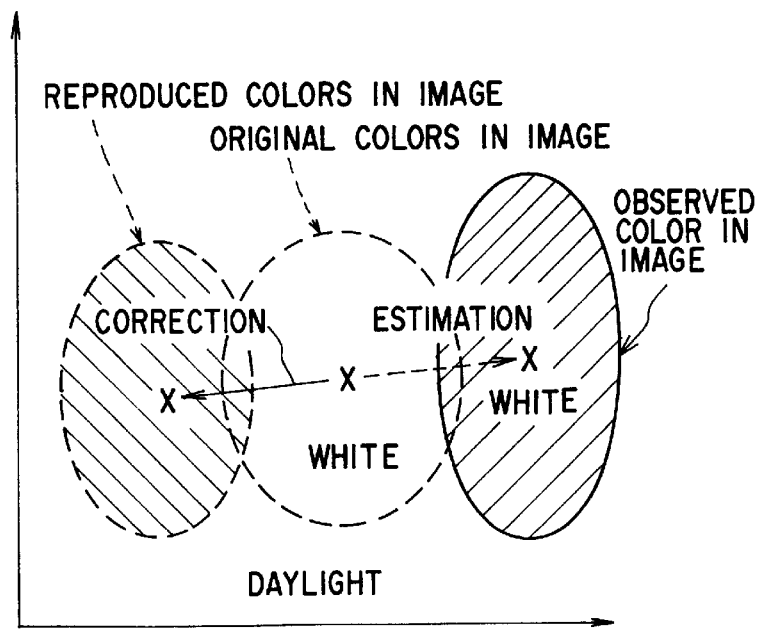
F I G. 9B

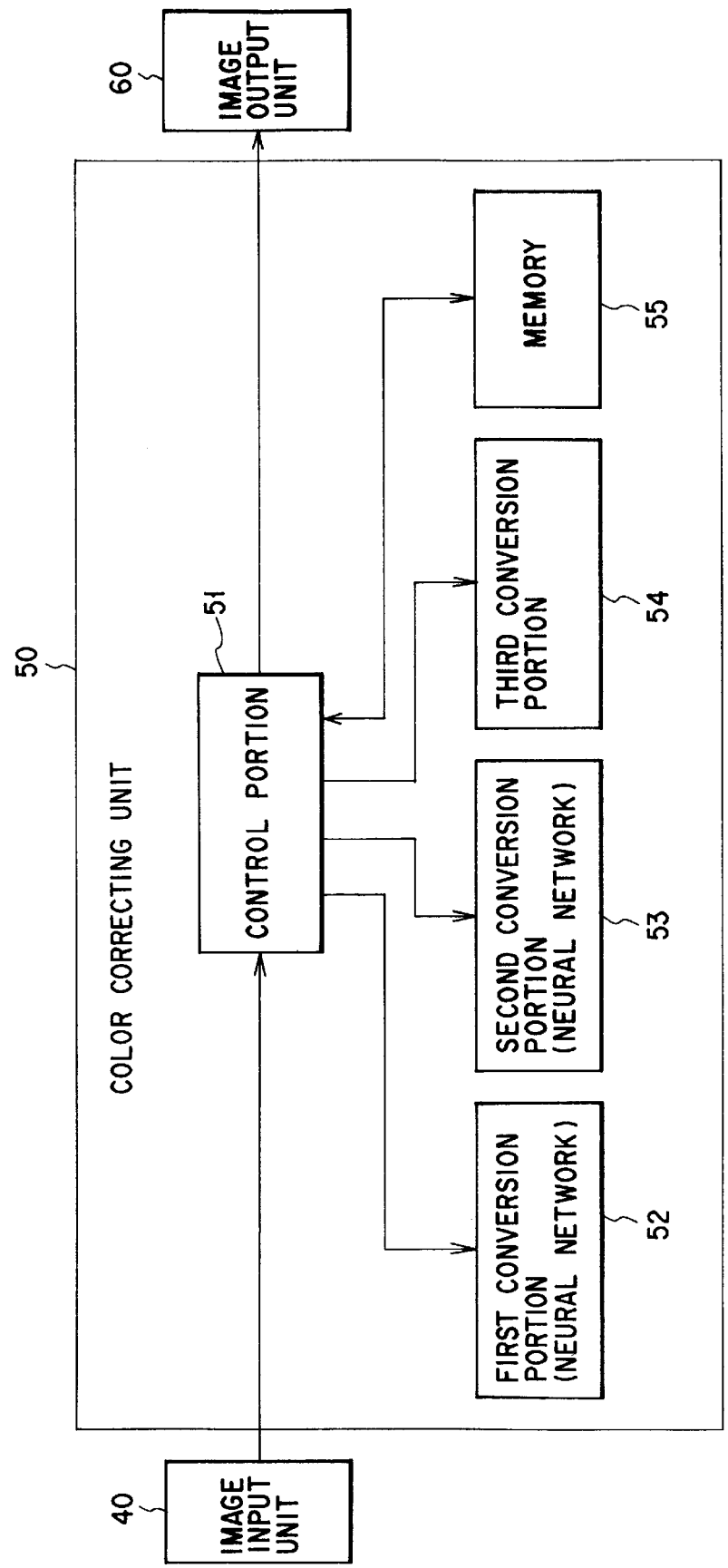
F I G. 10

COLOR CORRECTING METHOD AND APPARATUS

BACKGROUND OF THE INVENTION

1. Field of the Invention

The present invention relates to a color correcting method and apparatus for correcting a color shift of an object imaged by an image input device such as a digital camera or a CCD camera and for correcting a color shift in an image displayed on an image output device such as a sublimation printer in color DTP (DeskTop Publishing) and, more particularly, to a color correcting method and apparatus for performing color matching to correct the color of an imaged object or an output and displayed object to the color of the object under a daylight illuminant, using a spectral reflectance or transmittance for accurately expressing the physical properties (spectral colorimetry) of colors even if the object is photographed under any illuminant, and an image input device and an image output device (color reproduction device) having arbitrary characteristics are used.

2. Description of the Related Art

In observing an object with a human eye or imaging an object by an image input device such as a camera, the tint of the color of the object and the color of the object reproduced in a photograph are normally influenced by the difference in the type of illuminant (spectral distribution). The difference in the type of illuminant, i.e., the difference in the spectral distribution of an illuminant is called an illuminant change hereinafter.

Assume that an imaged object is observed as an image output at a sublimation printer or the like. When the illuminant in the photographing mode is different from that in the observation mode, the color of the photographed object has a color shift from the color of the observed output image due to the illuminant change between the photographing and observation modes. For example, a photograph taken under an incandescent or fluorescent lighting becomes reddish or greenish as compared with a photograph taken under a daylight illuminant. The reproduced image looks unnatural.

Even if a given output image is observed under different illuminants, a color shift may occur. The given output image observed under one illuminant may not be recognized as identical to the given output image observed under another illuminant.

A color shift may occur in accordance with the characteristics of an image input device for imaging an object or an image output device (or an image display device) for outputting the image.

In recent years, color DTP (DeskTop Publishing) has been very popular in personal publishing or intra-office printing. A digital camera or the like has been popularly used to allow direct editing and correction of a photographed digital image on a computer. In the color management system of general color DTP, proofreading is performed on the basis of a daylight illuminant such as a daylight illuminant D50. When the finished printed matter is observed with another illuminant, the color balance of the entire image is lost due to a color shift caused by the illuminant change. Therefore, the printed matter looks unnatural.

An image input device does not have any characteristics for correcting the color of an object under the incandescent or fluorescent lighting to the color of the object under the daylight illuminant. The color of the object observed with a human eye may often be different from that imaged by the image input device.

A White Point Mapping (WPM) method generally used in a video camera or the like and a color correcting method (M. J. Vrhel, H. J. Trussell: Color Correction Using Principal Components, Color research and application, Vol. 17, No. 5, pp. 328–338 (1992)) proposed by Vrhel et. al. using an estimated spectral reflectance are available as techniques for correcting color shifts caused by illuminant changes for the input images.

Since the WPM method is, however, a method of simply correcting only white to white under the daylight illuminant, the color balance of the image cannot be corrected. The color correcting accuracy in the color correcting method by Vrhel et. al. is insufficient in applications to apparatuses and cannot be used in color correction of a reproduced image having a color shift caused by the illuminant change.

A method of converting imaged colors into colors of an intermediate colorimetric system to perform color correction is available as a method of reproducing the colors of an imaged object without being affected by the characteristics of an image output device or the like. According to this method, however, the types of illuminants which allow the human eye to observe a given color as identical colors are limited (i.e., the number of spectral distributions of the illuminants is limited), and color matching is established in only a very limited environment (illumination). A variety of types of illuminations for observing colors output from an image output device, such as illuminations using an incandescent lighting, a fluorescent lighting, and a sunbeam, are available. It is impossible to always match the reproduced colors with the actual colors under these illuminants in the color reproduction method generally used in the state-of-the-art color DTP. No method is proposed to correct a reproduced image having a color shift caused by the illuminant change.

SUMMARY OF THE INVENTION

It is an object of the present invention to provide a color correcting method and apparatus in which the color of a reproduced image under an arbitrary illuminant and the corresponding color under the daylight illuminant, or the color of an object imaged under an arbitrary illuminant and the corresponding color under the daylight illuminant match regardless of illuminants used in the observation and photographing modes.

According to a first aspect of the present invention, there is provided a color correcting method in a system for outputting an image on the basis of color separation values of a reproduction target, comprising the steps of: converting the color separation values into values of an intermediate colorimetric system constituted by at least one of a spectral reflectance and a spectral transmittance, using a neural network which has been trained for conversion from the color separation values to the intermediate colorimetric system; calculating colorimetric values under a desired illuminant in accordance with the values of the intermediate colorimetric system; and optimizing the color separation values to be converted by the neural network, in accordance with the calculated colorimetric values and predetermined colorimetric values.

According to a second aspect of the present invention, there is provided a color correcting apparatus comprising: an image input unit for imaging an object to generate color separation values; conversion means, having a neural network, for converting the generated color separation values into one of spectral reflectance and transmittance values, using the neural network; means for obtaining colorimetric values under a desired illuminant using the values obtained by the conversion means; optimization means for optimizing the color separation values so that at least one of a square error and an average color difference between the obtained colorimetric values and predetermined colorimetric values becomes minimum; and means for outputting an image in accordance with the color separation values optimized by the optimization means.

According to a third aspect of the present invention, there is provided a color correcting apparatus comprising: input means for inputting color separation values; image output means for outputting an image in accordance with the color separation values; first conversion means for converting the input color separation values into one of spectral reflectance and transmittance values using a multi-layered feedforward neural network which has been trained in accordance with characteristics of the image output means; second conversion means for converting the color separation values from the input means into one of the spectral reflectance and transmittance values using a multi-layered feedforward neural network which has been trained in accordance with desired image output characteristics; and optimization means for obtaining colorimetric values under a desired illuminant from the values obtained from the first and second conversion means, and optimizing the input color separation values so as to minimize at least one of a square error and an average color difference between the colorimetric values.

In a color correcting method and apparatus having the above arrangement and using a spectral reflectance or transmittance independently of an illuminant to correct a color shift caused by an illuminant change, the training function of a neural network is effectively utilized to perform highly accurate conversion between spectral reflectance and color separation value associated with colors expressed by CMY, CMYK, or RGB values.

Since the neural network having the training conversion function between the set of color separation values such as CMY, CMYK, or RGB values and the spectral reflectances or transmittances is used, a sufficiently trained neural network uses its generalization capability to provide an appropriate output even for unknown input data not used in training.

Highly reliable color correction independent of an apparatus or an illuminant can be realized in accordance with a nonlinear optimization technique having a requirement for minimizing a square norm or average color difference between: the colorimetric values under the daylight illuminant and a designated illuminant or the response values of an optical filter or a CCD sensor, or the colorimetric values of an image obtained under the designated illuminant or the response values of the optical filter and the CCD sensor; and the colorimetric values calculated from a spectral reflectance obtained by a neural network or the response values of the optical filter and the CCD sensor. Therefore, the spectral reflectance is used as an intermediate color expression like the CIE L*a*b* values or the CIE XYZ values. Color reproduction can be realized independently of the illuminant as well as the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 7A to 7F are graphs for explaining the effect of the color correcting apparatus shown in FIG. 1, illustrating the graphs and histograms obtained when this color correcting apparatus is compared with two prior arts for a F3 illuminant;

FIGS. 8A to 8F are graphs for explaining the effect of the color correcting apparatus shown in FIG. 1, illustrating the graphs and histograms obtained when this color correcting apparatus is compared with two prior arts for an A illuminant;

FIGS. 9A and 9B are views for explaining a difference between the color correcting apparatus of the first embodiment and that of the second embodiment according to the present invention;

FIG. 10 is a block diagram showing the arrangement of the color correcting apparatus according to the second embodiment of the present invention;

DETAILED DESCRIPTION OF THE PREFERRED EMBODIMENTS

The basic concept of a color correcting apparatus according to the present invention will be described below.

In a color constancy phenomenon in color perception of higher animals such as men or monkeys, an assumption for simultaneously estimating the spectral reflectance of the surface of an object and the spectral distribution of an illuminant from the response values (e.g., CMY values) from three types of retinal cones as a kind of optical sensor is used. According to a lot of reports, in a color perception model, the visual system estimates the spectral reflectance from the response values. The estimation result of this color perception model can explain the color constancy phenomenon in color perception. At present, such an assumption is regarded as plausible.

According to the present invention, the above fact is actually applied to an intermediate colorimetric system for reproducing a color and correcting a color shift independently of an apparatus and an illuminant in the fields of color reproduction. The spectral reflectances of the reproduced color and the color of the input image are estimated, and color reproduction independent of an illuminant is realized.

An apparatus for correcting a color shift according to the present invention uses a neural network which has been trained for conversion between the color separation values such as CMYK or RGB values from a standard image output device and an image input device and the spectral reflectances (or the spectral transmittances) of the reproduced (output) or input image colors. In addition, the output values from the neural network are converted into color-corrected color separation values in accordance with the colorimetric values under the daylight illuminant and the designated illuminant. Optimization includes a requirement for minimizing the square error (square norm) of the response values of the optical filter or CCD sensor, or a requirement for minimizing the average color difference, and a detailed description thereof will be made later.

An apparatus for correcting a color shift according to an embodiment of the present invention will be described with reference to the accompanying drawings.

Figure 1:
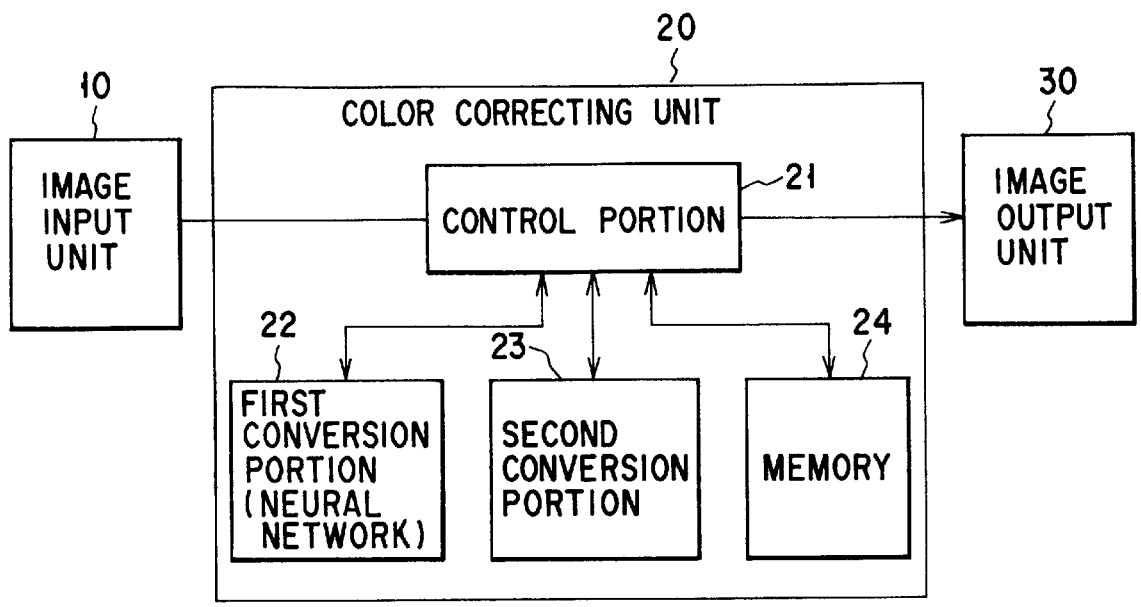
FIG. 1 is a block diagram showing the arrangement of a color correcting apparatus according to the first embodiment.

The functional arrangement of the apparatus for correcting a color shift according to the first embodiment of the present invention is shown in FIG. 1. As shown in FIG. 1, the apparatus for correcting a color shift comprises an image input unit 10, a color correcting unit 20, and an image output unit 30. The image input unit 30 comprises an image input device using an optical filter and a CCD sensor such as a digital camera or a CCD camera to convert the colors of a target object into color separation values such as RGB or CMY (CMYK) values or the like and outputting the color separation values as electrical signals. The image output unit 30 comprises an image output device such as a sublimation printer in color DTP (DeskTop Publishing) to output an image onto a display or paper in accordance with the input color separation values. The color correcting unit 20 comprises a control portion 21 for controlling the overall color correction operation, a first conversion portion 22 constituted by a neural network, a second conversion portion 23 for performing conversion under a predetermined requirement, and a memory 24 for storing various parameters associated with the first and second conversion portions.

The first conversion portion 22 performs training so as to have a conversion function (to be described later) under the control of the control portion 21. Under the control of the control portion 21, the second conversion portion 23 converts the colorimetric values of an image input under a designated illuminant (to be described later) or the response values of the optical filter and the CCD sensor into colorimetric values calculated from the spectral distribution of the designated illuminant in accordance with the spectral reflectance as an output from the first conversion portion 22 and color matching functions stored in the memory 24, and the spectral characteristics of the optical filter and the CCD sensor. In this case, optimization is performed with a requirement for minimizing the average color difference or the square error between the response values of the optical filter and the CCD sensor, thereby obtaining color-corrected color separation values. Note that the respective formulas and values are expressed in vectors in this specification, so the square error has the same meaning as that of a square norm.

Figure 2:
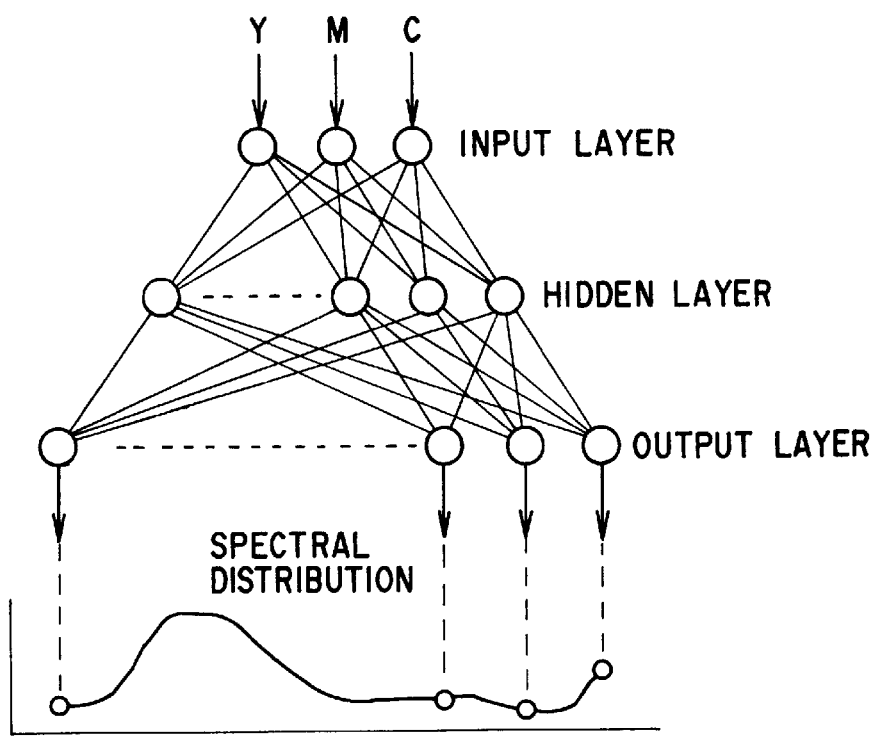
FIG. 2 is a view showing a neural network applied to a first conversion portion in the color correcting apparatus shown in FIG. 1.

The first conversion portion 22 also converts an electrical signal having an appropriate initial value into a spectral reflectance. An example of the neural network used in this first conversion portion 22 is shown in FIG. 2. As shown in FIG. 2, a hidden layer is preferably constituted by neural circuit elements whose input/output relationship is represented by a sigmoid function. The input and output layers are preferably constituted by linear neural circuit elements. The output layer may be constituted by neural circuit elements having sigmoid characteristics as in the hidden layer. The neural network shown in FIG. 2 comprises output units U1, U2, ... corresponding to discrete spectral reflectances. The number of units of the input layer is 3, and the number of units of the hidden layer is 18. The number of units of the output layer is 31.

The control portion 21 uses the second conversion portion 23 to perform optimization with a requirement for minimizing an average color difference or square error (square norm) between: the electrical signals output from the first conversion portion 22, i.e., the colorimetric values under the designated illuminant and the response values of the optical filter and the CCD sensor; and the colorimetric values under the designated illuminant, sent from the image input unit 10 and the response values of the optical filter and the CCD sensor. By using the spectral reflectance calculated in this optimization, color-corrected color separation values are calculated.

The memory 24 stores the connection weights of the trained neural network, the spectral distributions of usable illuminants, and color matching functions, the spectral characteristics of the optical filter and the CCD sensor which can be applied to the image input unit 10, and the like.

The first conversion portion 22 constituted by the neural network and the second conversion portion 23 will be described below.

The image input unit 10 shown in FIG. 1 converts at least three color separation values associated with the imaged colors into corresponding electrical signals. That is, the electrical signals are output as electrical signals representing color separation values such as C (cyan), M (magenta), and Y (yellow) values, C (cyan), M (magenta), Y, (yellow), and K (black) values, or R (red), G (green), and B (blue) values of the original colors subjected to color information conversion.

When the color separation values such as CMY, CMYK, or RGB values are input to the input layer of the first conversion portion 22 as appropriate initial values, outputs Hi of the hidden layer units of the neural network having the structure shown in FIG. 2 are given as follows:

$$H_i = f(net_i) \qquad (1)$$

$$net_i = \sum_{i=1}^{m}\sum_{j=1}^{n} W^{(h)}{}_{ij} I_j + b_i$$

where W(h)ij represents the connection weight between the jth input unit and the ith hidden unit, Ii represents an output from the hidden unit, and bj represents a bias value. Outputs Oi from the output layer units are defined in the same manner as described as follows:

$$O_i = f(net_i) \quad (2)$$

$$net = \sum_{i=1}^{k}\sum_{j=1}^{m} W^{(o)}{}_{ij} H_j + b_i$$

where W(o)ij is the connection weight between the jth hidden unit and the ith output unit, Hi is an output value from the ith hidden unit, which is defined by formula (1), and n, m, and k are the numbers of units of the input, hidden, and output layers. At this time, the characteristics of the unit of the input layer are characteristics in which an input is directly output, and a function f(x) of the hidden layer unit has characteristics represented by a sigmoid function monotonously increasing in the [0,1] range defined in the following formula:

$$f(x) = \frac{1}{\{1 + e^{-x}\}} \quad (3)$$

The output unit has characteristics represented by a sigmoid or linear function. Note that the output layer may receive an input from a bias unit.

The connection weights of the neural network are trained and corrected to minimize square errors between outputs from the respective output units and spectral reflectances supplied as training signals. A back-propagation algorithm proposed by Rumelhart is used in training to train conversion from CMY, CMYK, or RGB values to spectral reflectances. The connection weights of the trained neural network are stored in the memory 24.

The second conversion portion 23 uses spectral reflectances R(C,M,Y) as outputs from the first conversion portion 22, calculated from the neural network which has been trained for conversion from the color separation values from the image input unit 10 to the spectral reflectances, the color matching functions or the spectral characteristics of the optical filter and the CCD sensor of the image input unit 10, and a spectral distribution L of the designated illuminant to calculate received color values as follows:

$$t = M^T L R(C,M,Y) \quad (4)$$

The second conversion portion 23 uses spectral reflectances Rd(C,M,Y) calculated by optimization of the outputs from the first conversion portion 22 under a requirement for minimizing an average color difference or square error (square norm) between: the colorimetric values calculated by formula (4) and the response values of the optical filter and the CCD sensor; and the colorimetric values of the designated illuminant, sent from the image input unit 10, or the response values of the optical filter and the CCD sensor, thereby obtaining color-corrected colorimetric values by formula (5), or at least three color separation values:

$$t_d = M^t L R_d(C,M,Y) \quad (5)$$

The set of color-corrected color separation values converted in optimization in the second conversion portion 23 is sent to the image output unit 30 and converted into arbitrary signals such as electrical or optical signals.

Training of the first conversion portion 22 in the first embodiment will be described together with illumination light applied to the first and second embodiments.

Figure 3:
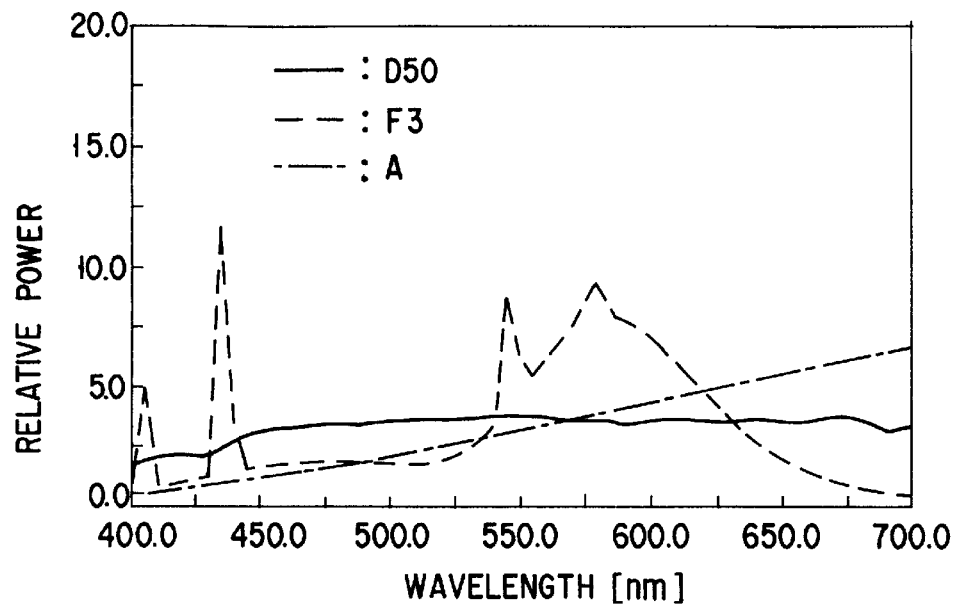
FIG. 3 is a graph showing the spectral distributions of three illuminants applied to the present invention.

In the first embodiment and the second embodiment (to be described later), a D50 illuminant (daylight illuminant D50), an A illuminant (incandescent lighting), and a F3 illuminant (fluorescent lighting) whose spectral distributions are defined in the CIE (Commission Internationale de l'Eclairage) are used. The spectral distributions of the respective illuminants are shown in FIG. 3. The distributions of the respective illuminants are normalized to equalize the energies.

Figure 4:
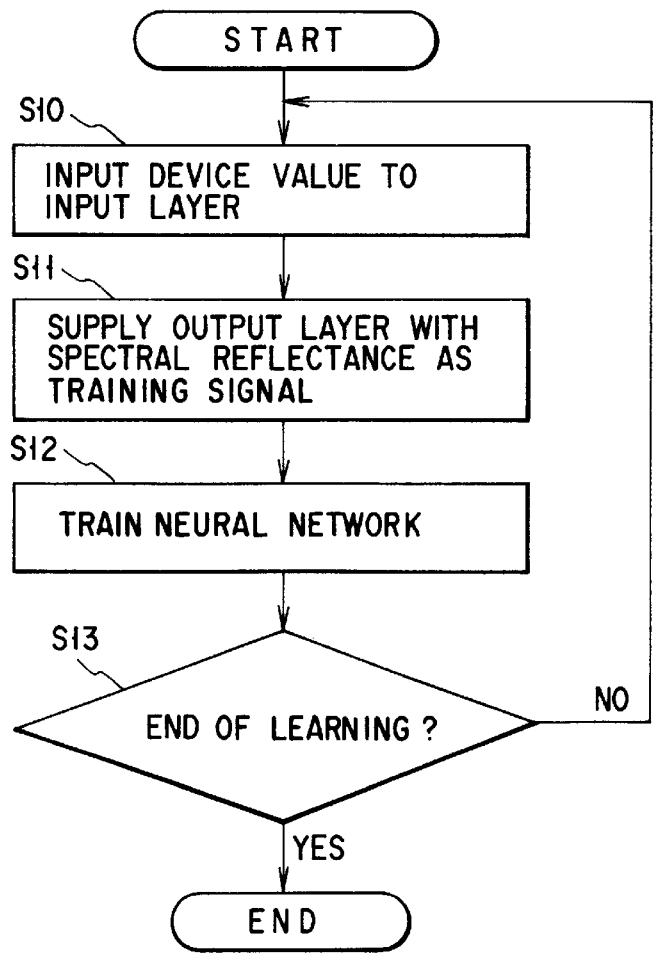
FIG. 4 is a flow chart showing training of the neural network shown in FIG. 2.

FIG. 4 shows training of the first conversion portion 22 constituted by the neural network. As described above, this training is performed under the control of the control portion 21. Note that CCD spectral characteristics are simplified using CIE color matching functions. Spectral reflectance data used in training of the neural network are data calculated by causing a spectro-colorimeter to measure the spectral reflectances of 1,331 color chips printed by changing the CMY values from 0% to 100% at an interval of 10% by the image output unit 30. CMY values in colorimetric operation are used as color separation values, thereby simplifying the color separation values. Note that 216 color data of all the data are used as the training data.

Device values are input to the input layer of the first conversion portion 22 (step S10). In this case, the CMY values from the image output unit 30 such as the sublimation printer described above are input to the input layer. The spectral reflectances measured by the spectro-colorimeter for the outputs from the output layer are supplied as training signals (step S11). Training is performed on the basis of the backpropagation algorithm (step S12). That is, the coupling strengths (connection weights) of the units in the neural network are changed such that the values output from the output layer come close to the spectral reflectances serving as the training signals.

It is then determined whether training in step S12 satisfies a predetermined training requirement, e.g., whether the number of changes in connection weights reaches a predetermined number of times, and whether an error between the value output from the output layer and the corresponding spectral reflectance serving as the training signal falls within the predetermined allowance (step S13). If the predetermined training requirement is satisfied, the connection weights of the neural network are stored in the memory 24, and training is ended (YES in step S13). If the training requirement, however, is not satisfied, training from step S10 is repeated (NO in step S13).

Figure 5:
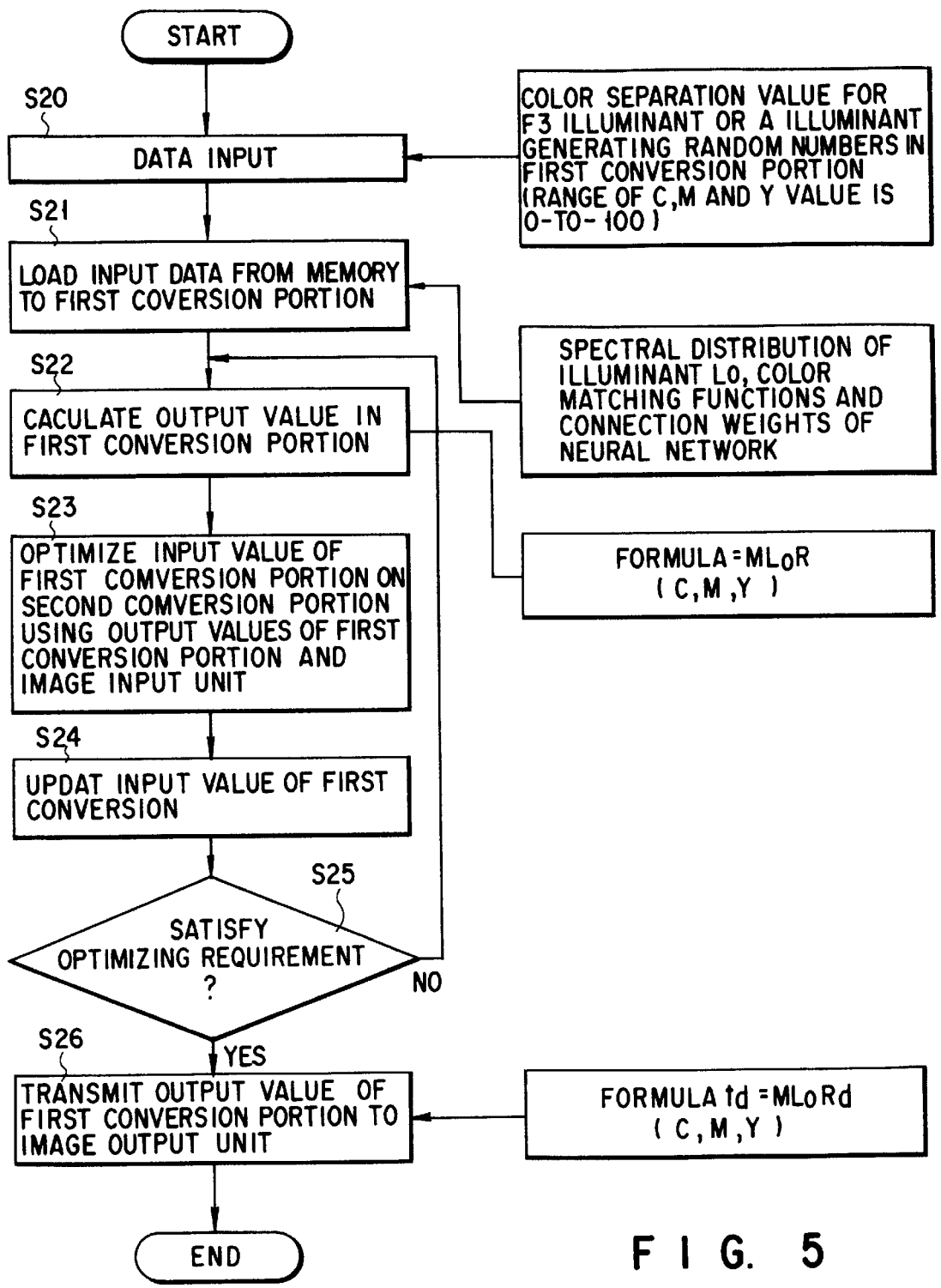
FIG. 5 is a flow chart showing color correction by the color correcting apparatus shown in FIG. 1.

Color correction in the first embodiment will be described with reference to a flow chart in FIG. 5.

Color correction of images obtained by the image input unit 10 using the A illuminant (incandescent lighting) and the F3 illuminant (fluorescent lighting) is performed. This color correction is performed under the control of the control portion 21.

The color separation values (CMY values) of an object imaged under A and F3 illuminants by the image input unit 10 are sent to the color correction unit 20 (step S20). At the same time, the second conversion portion 23 receives random numbers as initial value settings. Range of C, M, and Y values of the CMY values are the 0-to-100 range. The spectral distribution of the illuminant L0 (D50 illuminant) and the color matching functions stored in the memory 24, and the connection weights of the neural network which are determined in the above-mentioned training are loaded to the first conversion portion 22 (step S21). The first conversion portion 22 converts the random-input CMY values into corresponding spectral reflectances (step S22). The response values of the CCD sensor are calculated by formula (4) using the resultant spectral reflectances, the spectral characteristics of the CCD sensor which are stored in the memory, and the spectral characteristics of the designated illuminant (D50 illuminant).

The second conversion portion 23 then performs optimization using the response values from the first conversion portion 22 and the CMY values sent from the image input unit 10 (step S23). This optimization is performed to minimize the average color difference or the square error (square norm) between the two response values, thereby updating the CMY values input to the first conversion portion 22 (step S24).

It is determined whether the updated CMY values satisfy the constraint for optimization, e.g., whether the square error (square norm) or the average color difference is less than a predetermined value (step S25). When the updated CMY values do not satisfy the constraint for optimization (NO in step S25), processing from step S22 is repeated in accordance with the updated CMY values. If the constraint for optimization is satisfied (YES in step S25), color separation values color-corrected by formula (5) using the spectral reflectances Rd obtained from the above processing are calculated (step S26).

Figure 6:
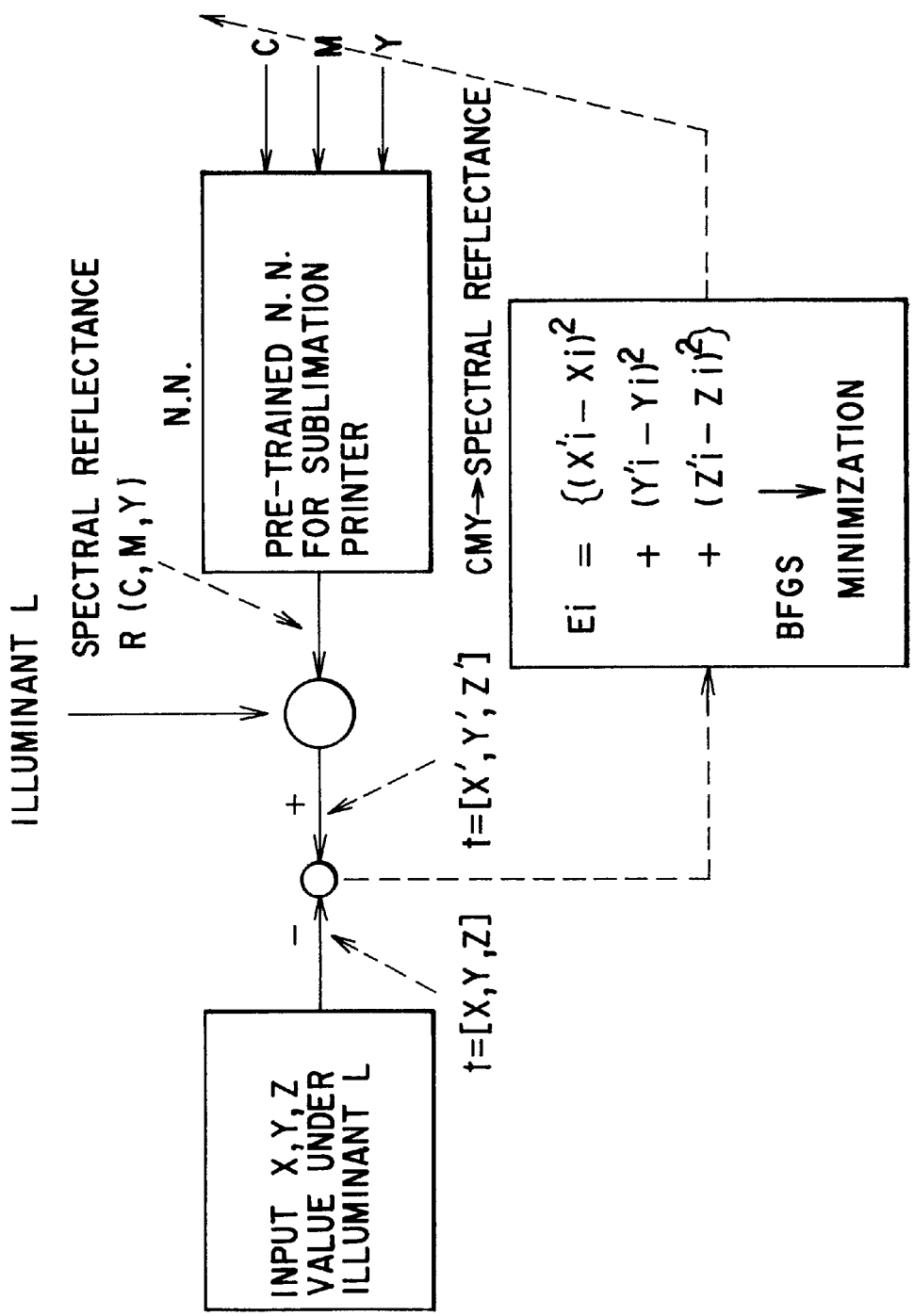
FIG. 6 is a diagram showing optimization in color correction shown in FIG. 5.

FIG. 6 shows the schematic processing flow in steps S23 and S24. Note that the BFGS method as a general technique for nonlinear optimization is used in optimizing two response values. It should be noted that an illuminant applied in trailing the neural network (N.N.) is given as an illuminant L10, a target illuminant, i.e., an illuminant for obtaining true X, Y, and Z values (t=[X,Y,Z]) is given as an illuminant L11, and an illuminant considered to calculate t=[X',Y',Z'] is given as an illuminant L12. In this case, although the illuminant L11 is identical to the illuminant L12, the illuminant L10 need not be identical to the illuminant L11 or L12.

Comparison between the present invention and the conventional methods, i.e., the WPM method and the method using a finite dimensional linear model proposed by Vrhel et. al. are shown in FIGS. 7A to 7F and 8A to 8F. FIGS. 7A to 7F show the evaluation in use of the F3 illuminant, and FIGS. 8A to 8F show the evaluation in use of the A illuminant. The accuracy evaluation results of color correction of F3 and A illuminants are shown in FIGS. 7C, 7F, 8C and 8F. The results obtained by the WPM (White Point Mapping) method are shown in FIGS. 7A, 7D, 8A and 8D, and the results obtained by the method proposed by Vrhel et. al. are shown in FIGS. 7B, 7E, 8B and 8E.

The upper graphs show the plots of color correction errors calculated by formula (6) on the a*-b* planes of the CIE L*a*b* spaces:

$$L^* = 116\left(\frac{Y}{Y_0}\right)^{\frac{1}{3}} - 16 \quad (6)$$

$$a^* = 500\left[\left(\frac{X}{X_0}\right)^{\frac{1}{3}} - \left(\frac{Y}{Y_0}\right)^{\frac{1}{3}}\right]$$

$$b^* = 200\left[\left(\frac{Y}{Y_0}\right)^{\frac{1}{3}} - \left(\frac{Z}{Z_0}\right)^{\frac{1}{3}}\right]$$

for $$X = \sum_{\lambda=380}^{780} S(\lambda)R(\lambda)\bar{x}(\lambda)d\lambda$$

-continued $$Y = \sum_{\lambda=380}^{780} S(\lambda)R(\lambda)\bar{y}(\lambda)d\lambda$$

$$Z = \sum_{\lambda=380}^{780} S(\lambda)R(\lambda)\bar{z}(\lambda)d\lambda$$

Points represent the colors, at the D50 illuminant, corresponding to the spectral reflectances obtained by actually measuring the respective color chips used for evaluation. Thin lines represent correction errors. The lower graphs represent color difference histograms of the correction errors with respect to evaluation data. Each vertical line represents the average color difference of 125 colors. In this case, the color difference is calculated as follows:

$$\Delta E = \sqrt{(L_0^* - L_1^*)^2 + (a_0^* - a_1^*)^2 + (b_0^* - b_1^*)^2} \quad (7)$$

Colors near the origin of the a*-b* plane of the reference white can be corrected with almost no errors in the WPM method. However, large errors occur in chromatic colors (colors away from the origin) and have various directions. The average and maximum color differences for the F3 illuminant are as large as 11.204 and 25.324, respectively, and the average and maximum color differences for the A illuminant are as large as 9.8286 and 20.768, respectively. To the contrary, according to the method proposed by Vrhel et. al., not only colors near the reference white but also other colors can be corrected with relatively high accuracy. This can be confirmed because the average and maximum color differences for the F3 illuminant are 3.8296 and 15.386, respectively, and the average and maximum color differences for the A illuminant are 3.8705 and 17.709, respectively. The first embodiment can realize correction with a higher accuracy than that in the method proposed by Vrhel et. al. The average and maximum color differences for the F3 illuminant are as small as 1.7076 and 12.716, respectively, and the average and maximum color differences for the A illuminant are as small as 1.4607 and 11.679, respectively. According to the result of a psychological experiment, since it is difficult to discriminate two adjacent colors having a color difference of 2 or less with a naked eye, color correction accuracy of the first embodiment is sufficient, thus exhibiting effectiveness of the first embodiment.

The second embodiment of the present invention will be described with reference to the accompanying drawings.

A difference from the first embodiment will be described with reference to FIGS. 9A and 9B. FIGS. 9A and 9B show color correction of an input image and color correction of an output (reproduced) image.

As previously described, in color correction of an input image (e.g., an image from a camera or video camera), a variety of illuminants are used in photography. For example, when photography is performed indoors, the illuminant is a fluorescent or incandescent lighting. When photography is performed outdoors, the illuminant is a sunbeam. In this manner, the images are photographed under various illuminants. The resultant images already have color shifts due to the influences (illuminant changes) of the illuminants.

In the first embodiment described above, an image already having a color shift due to the influence of an illuminant is corrected into an image photographed under the standard illuminant (D50 illuminant). This correction is shown in FIG. 9A.

In reproduction of an image at an image output device such as a printer, the color tint greatly changes depending on the type of illuminant under which the reproduced image is observed. To solve this problem, according to the second embodiment, a specific type of illuminant under which an output image is observed is checked in advance (the color tint of the image under the designated illuminant), and correction is performed to match the image observed under the standard illuminant with the color tint of the image observed under the designated illuminant. To perform this correction, prior to reproduction of an image, (prior to an actual output at a printer or the like), the color tint of the image under the designated illuminant is predicted, the image is inversely corrected in accordance with the predicted color shift (i.e., a shift from the image under the standard illuminant), and then the image is reproduced. When the inversely corrected image is reproduced, a color difference from the image actually observed under the designated illuminant becomes zero. The color tint of the image reproduced under the designated illuminant matches the color tint of the image observed under the standard illuminant. This color correction is shown in FIG. 9B. Note that the second embodiment will exemplify color correction between images reproduced between two different printers.

The functional arrangement of an apparatus for correcting a color shift according to the second embodiment of the present invention is shown in FIG. 10. As shown in FIG. 10, this apparatus for correcting a color shift comprises an image input unit 40, a color correcting unit 50, and an image output unit 60. The image input unit 40 receives color separation values such as CMY values and outputs them as corresponding electrical signals to the color correcting unit 50. The image output unit 60 has the same arrangement as that of the image output unit 30 of the first embodiment.

The color correcting unit 50 comprises a control portion 51 for controlling the overall color correction operation, first and second conversion portions 52 and 53 constituted by neural networks, respectively, a third conversion portion 54 for performing conversion with a predetermined requirement, networks of the first and second conversion portions, and a memory for storing various parameters associated with the third conversion portion 54. Note that the first and second conversion portions 52 and 53 have conversion functions (to be described later) and are trained to realize these conversion functions under the control of the control portion 51.

The third conversion portion 54 performs optimization with a requirement for minimizing the average color difference or square error (square norm) between the colorimetric values of the daylight illuminant and the colorimetric values under the designated illuminant or the response values of the optical filter and the CCD sensor, thereby obtaining color-corrected color separation values.

Figure 11:
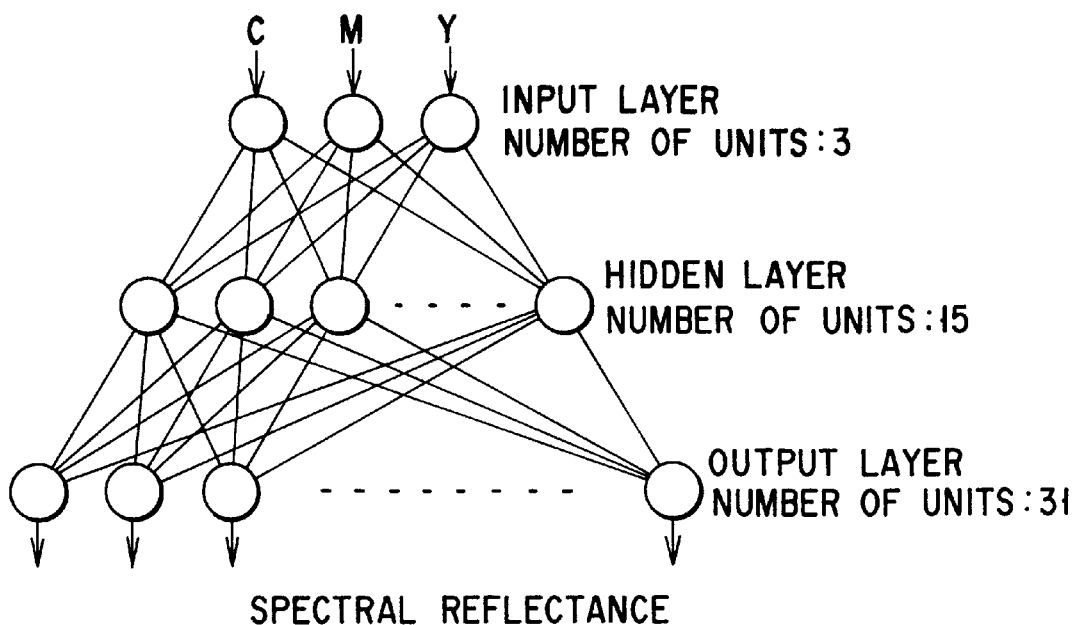
FIG. 11 is a view showing a neural network applied to a first conversion portion in the color correcting apparatus shown in FIG. 10.

The first conversion portion 52 outputs spectral reflectances corresponding to the input color separation values. An example of the neural network used in the first conversion portion 52 is shown in FIG. 11. As shown in FIG. 11, a hidden layer is constituted by neural circuit elements whose input/output relationship is represented by a sigmoid function. The hidden layer preferably receives an output from a bias unit. The input and output layers are preferably constituted by linear neural circuit elements. The output layer may be constituted by neural circuit elements having the sigmoid characteristics as in the hidden layer. Note that the output layer may receive an output from the bias unit. The number of units of the input layer is 3, the number of units of the hidden layer is 15, and the number of units of the output layer is 31.

Figure 12:
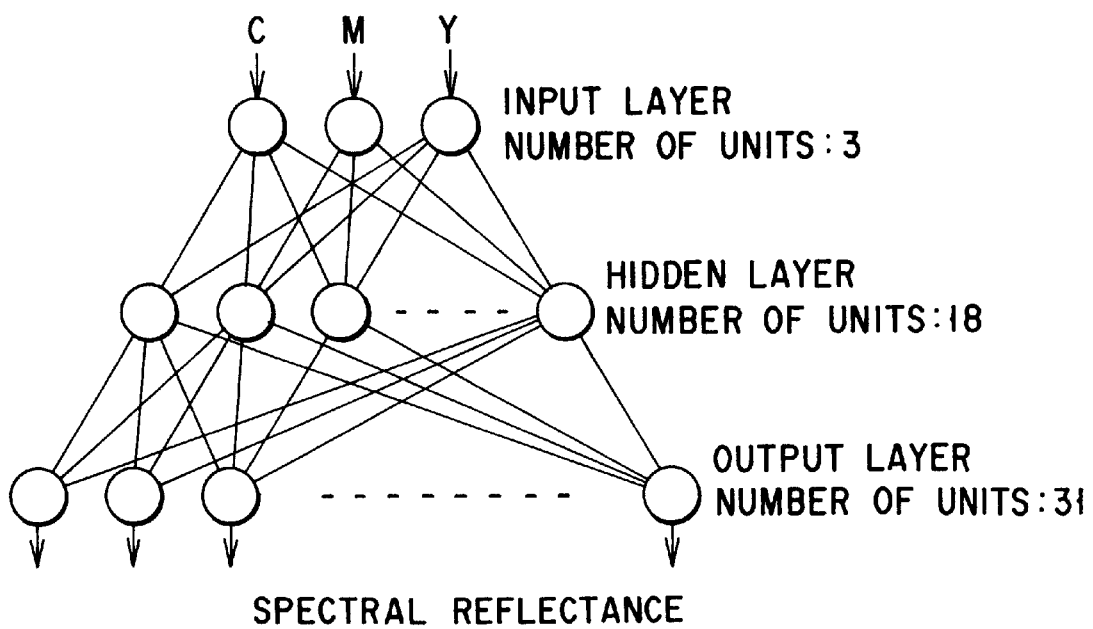
FIG. 12 is a view showing a neural network applied to a second conversion portion in the color correcting apparatus shown in FIG. 10.

The second conversion portion 53 receive arbitrary color separation values as initial values and outputs spectral reflectances corresponding to these initial values. An example of the arrangement of the neural network used in the second conversion portion 53 is shown in FIG. 12. As shown in FIG. 12, a hidden layer is constituted by neural circuit elements whose input/output relationship is represented by a sigmoid function. The hidden layer preferably receives an output from a bias unit. The input and output layers are preferably constituted by linear neural circuit elements. The output layer may be constituted by neural circuit elements having the sigmoid characteristics as in the hidden layer. Note that the output layer may receive an output from the bias unit. The number of units of the input layer is 3, the number of units of the hidden layer is 18, and the number of units of the output layer is 31.

Training of the first and second conversion portions 52 and 53 will be described below.

Training of the neural networks of the first and second conversion portions 52 and 53 is performed under the control of the control portion 51. A training flow is shown in FIG. 4 and is the same as in the first embodiment, and a detailed description thereof will be omitted. Note that input values to the first conversion portion 52 are given as CMY values for a proof printer, and that the spectral reflectances obtained by causing a spectro-colorimeter to measure color chips printed at this printer are given as training signals. The CMY values of a sublimation printer are given as the input values to the second conversion portion 53. The spectral reflectances obtained by causing a spectro-colorimeter to measure color chips printed at this printer are given as training signals.

Figure 13:
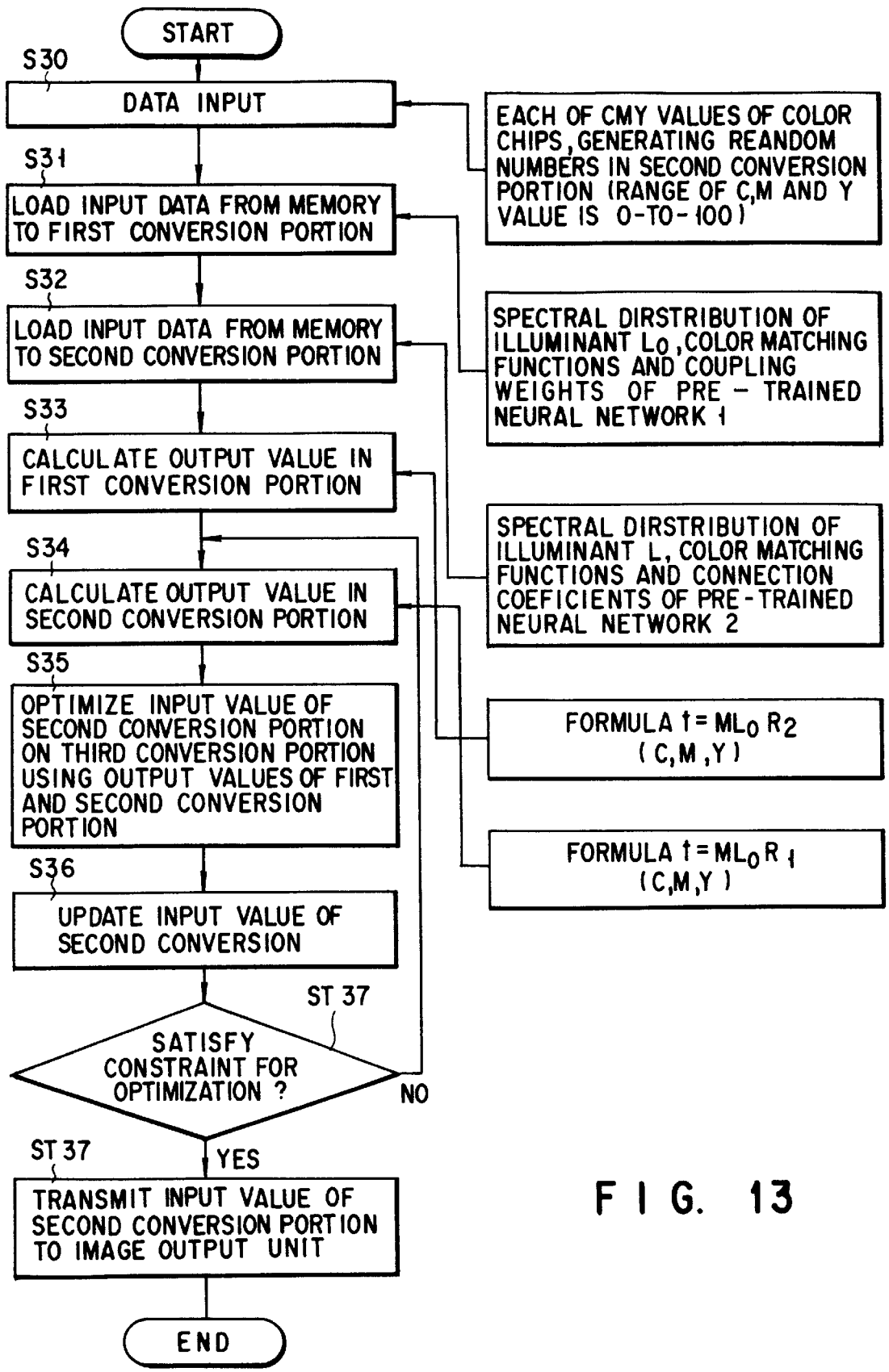
FIG. 13 is a flow chart showing color correction in the color correcting apparatus shown in FIG. 10.

Color correction of the second embodiment will be described with reference to a flow chart in FIG. 13.

The color separation values (CMY values) of the color chips are input from the image input unit 40 to the color correcting unit 50 (step S30). At the same time, the second conversion portion 53 receives random numbers as initial value settings. Range of the C, M, and Y values of the CMY values are the 0-to-100 range. The spectral distribution of an illuminant L0 (D50 illuminant) and the color matching functions stored in the memory 55, and the connection weights of the neural network which are determined in the above-mentioned training are loaded to the first conversion portion 52 (step S31). The spectral distribution of an illuminant L and the color matching functions stored in the memory 55, and the connection weights of the neural network which are determined in the above-mentioned training are loaded to the second conversion portion 53 (step S32). The first conversion portion 52 converts the CMY values from the image input unit 40 into the corresponding spectral reflectances on the basis of formulas (1) and (2) (step S33). The second conversion portion 53 converts the random-input CMY values into the corresponding spectral reflectances on the basis of formulas (1) and (2) in the same manner as in the first conversion portion 52 (step S34).

The third conversion portion 54 then performs optimization on the basis of the outputs from the first and second conversion portions 52 and 53 (step S35). This optimization is performed to minimize the average color difference or square error (square norm) between the two response values, thereby updating the CMY values input to the second conversion portion 53 (step S36).

More specifically, the third conversion portion 54 optimizes the outputs from the second converting portion 53 to output color-corrected color separation values in accordance with a requirement for minimizing the average color difference or square error (square norm) between: spectral reflectances R2(C,M,Y) as the outputs from the first conversion portion 52, calculated using the neural network which has been trained for conversion from the color separation values of the standard color reproduction device into the spectral reflectances, and colorimetric values calculated by formula (4) using color matching functions stored in the memory 55, spectral characteristics M of the optical filter and the CCD sensor, and the spectral distribution L0 of the daylight illuminant, or the response values of the optical filer and the CCD sensor; and the spectral reflectances as outputs from the second conversion portion 53, obtained using the neural network which has been trained for conversion from the color separation values to the spectral reflectances in the color reproduction device as a color correction target, and colorimetric values calculated by formula (4) using the color matching functions stored in the memory 55, the spectral characteristics R1(C,M,Y) of the optical filter and the CCD sensor, and the spectral distribution L of the designated illuminant, or the response values of the optical filter and the CCD sensor.

Figure 14:
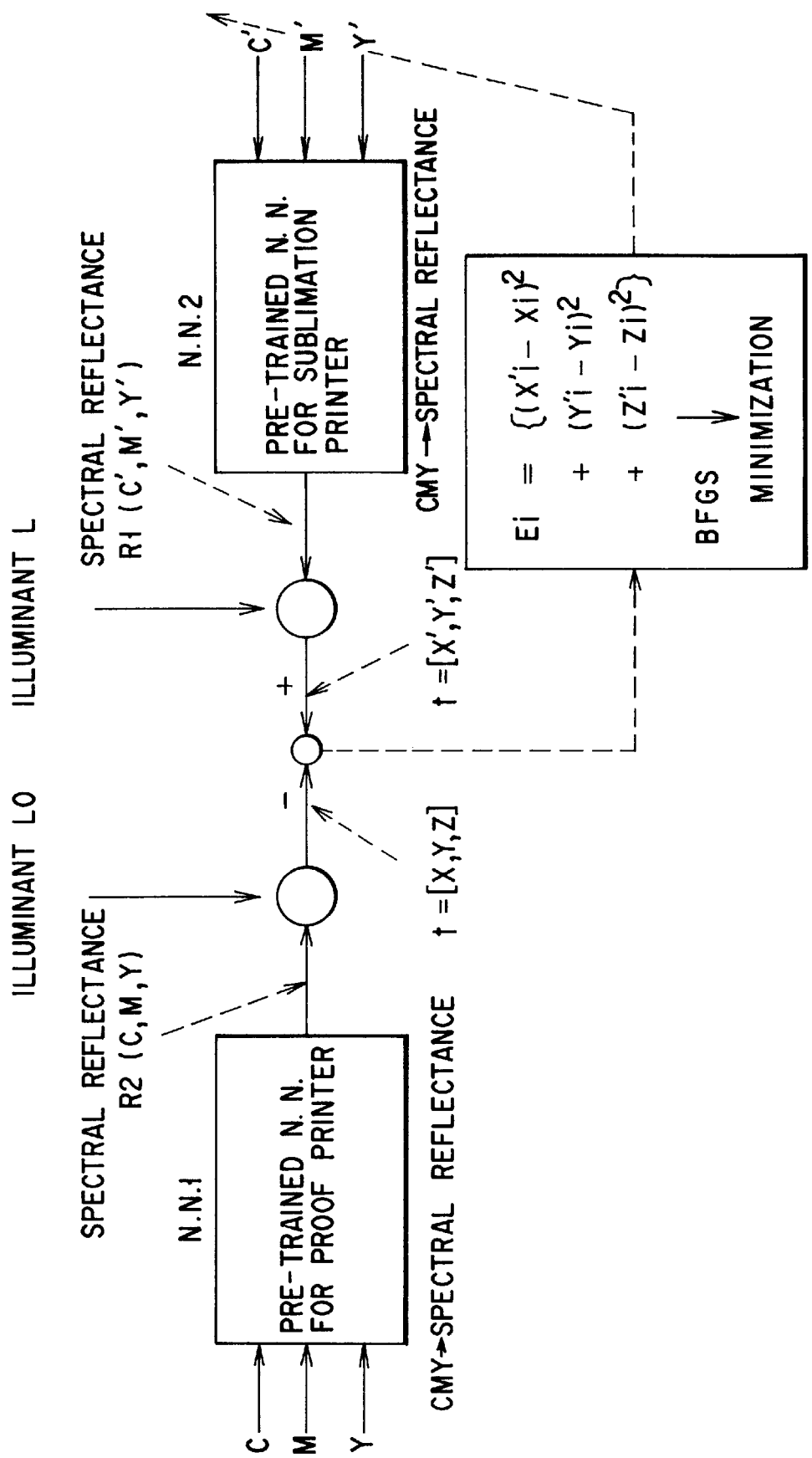
FIG. 14 is a view showing optimization in color correction shown in FIG. 13.

It is determined whether the updated CMY values satisfy a constraint for optimization, e.g., whether the square error (square norm) or average color difference satisfies a certain requirement of a predetermined value or less (step S37). If this constraint for optimization is not satisfied (NO in step S37), processing from step S34 is repeated in accordance with the CMY values. If the constraint for optimization, however, is satisfied (YES in step S37), the CMY values determined upon updating are sent to the image output unit 60 as the color-corrected color separation values (step S38). FIG. 14 shows the schematic processing flow in steps S35 and S36.

Figures 15A, 15B:
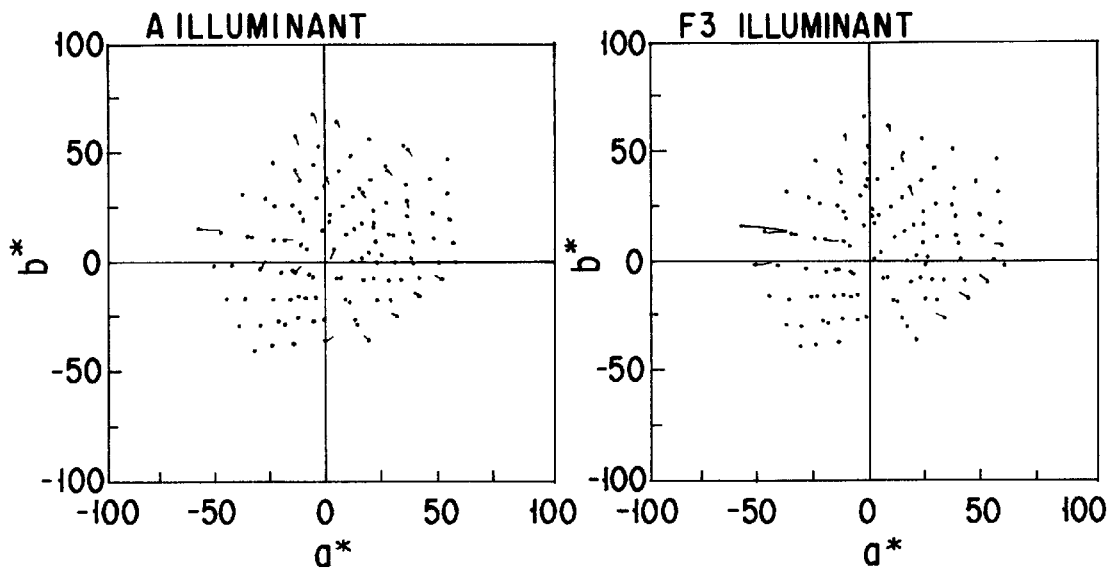
FIGS. 15A to 15D are views for explaining the effect of the color correcting apparatus shown in FIG. 10, illustrating the graphs and histograms of correction accuracies for F3 and A illuminants in this color correcting apparatus.
Figures 15C, 15D:
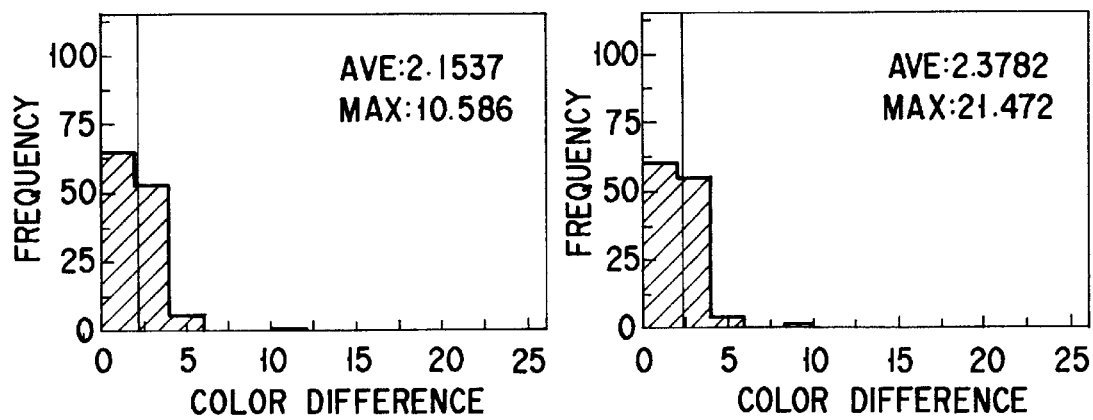

According to the second embodiment, the designated illuminants are F3 and A illuminants. FIGS. 15A and 15C show the evaluation results upon comparison between the CIE L*a*b* values of the colors printed by the standard color reproduction device using the D50 illuminant and the CIE L*a*b* values of the colors printed by a color reproduction device as a color correction target. FIGS. 15B and 15D show the evaluation results upon comparison between the CIE L*a*b* values using D50 and F3 illuminants.

According to the second embodiment, the average and maximum color differences for the F3 illuminant are as small as 2.3782 and 21.472, respectively, and the average and maximum color differences for the A illuminant are as small as 2.1537 and 10.586, respectively. According to the result of a psychological experiment, since it is difficult to discriminate two adjacent colors having a color difference of 2 or less with a naked eye, color correction accuracy of the second embodiment is sufficient, thus exhibiting effectiveness of the second embodiment.

The first and second embodiments have exemplified the spectral reflectances, but spectral transmittances may be used in place of the spectral reflectances.

As has been described in detail, according to the present invention, the spectral reflectance or transmittance independent of the type of illuminant is used, and the training function of the neural networks is effectively utilized. Even if the colors are expressed by CMY or CMYK values, or by the RGB values, conversion between the color separation values of these colors and the spectral reflectances can be realized with a high accuracy. Since the neural networks having the training function are used in conversion between the set of color separation values such as RGB values and the spectral transmittances, a sufficiently trained neural network uses its generalization capability to provide an appropriate output even for unknown input data not used in training.

Highly reliable color correction independent of an apparatus or an illuminant can be realized in accordance with a nonlinear optimization technique having a requirement for minimizing a square norm or average color difference between: the colorimetric values under the daylight illuminant and a designated illuminant or the response values of an optical filter or a CCD sensor, or the colorimetric values of an image obtained under the designated illuminant or the response values of the optical filter and the CCD sensor; and the colorimetric values calculated from a spectral reflectance calculated by a neural network or the response values of the optical filter and the CCD sensor. Therefore, the spectral reflectance is used as an intermediate color expression like the CIE L*a*b* values or the CIE XYZ values. Color reproduction can be realized independently of the illuminant as well as the apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A color correcting method in a system for printing an image of an object on the basis of a color separation value of the image of the object under a given illuminant, the method comprising the steps of:

converting a color separation value to be supplied to a system for printing an image of an object into an intermediate colorimetric system value of one of a spectral reflectance and a spectral transmittance;

calculating an estimation value of a colorimetric value of the object under a reference illuminant in accordance with the intermediate colorimetric system value and a spectral distribution of the reference illuminant; and optimizing the color separation value in accordance with the estimation value of the colorimetric value and a colorimetric value of an image of the object under a given illuminant.

2. A method according to claim 1, wherein the optimizing step comprises a substep of optimizing the color separation value so that one of a square error and an average color difference between the estimation value of the colorimetric value and the colorimetric value of the object under the given illuminant becomes minimum.

3. A method according to claim 1, wherein the predetermined colorimetric values are colorimetric values of the reproduction target under the desired illuminant.

4. A method according to claim 1, wherein the color separation value is a set of R (red), G (green), and B (blue).

5. A method according to claim 1, wherein the color separation value is one of a set and a set of C, M, Y, and K (black).

6. A method according to claim 1, in which said converting step uses a neural network which has been trained for conversion from the color separation value to the intermediate colorimetric value.

7. A method according to claim 6, wherein the neural network is a multi-layered feedforward neural network.

8. A method according to claim 1, wherein the optimizing step comprises performing nonlinear optimization.

9. A method according to claim 1, wherein the reference illuminant is one illuminant selected from the group consisting of an A illuminant, a B illuminant, a C illuminant, a D illuminant having an arbitrary color temperature, and F1 to F2 illuminants, all of which are defined by the CIE (Commission Internationale de l'Eclairage).

10. A color correcting apparatus comprising:
- an image input unit for imaging an object under a given illuminant, the object being printed by a given printing device to generate a color separation value;
- first conversion means, having a first neural network, for converting the color separation value;
- first conversion means, having a first neural network, for converting the color separation value into an intermediate colorimetric system value being one of a spectral reflectance and a spectral transmittance;
- means for obtaining an estimation value of the colorimetric value of the object under a reference illuminant in accordance with the intermediate colorimetric system value and a spectral distribution of the reference illuminant; and
- optimization means for optimizing the color separation value so that at least one of a square error and an average color difference between the estimation value of the colorimetric value and a colorimetric value of an object under the given illuminant becomes minimum.

11. A color correcting apparatus according to claim 10, in which the optimizing means comprises:
- second conversion means having a second neural network, for converting the color separation value into the intermediate colorimetric system value of the object under the given illuminant.

* * * * *